(12) United States Patent
Gao et al.

(10) Patent No.: US 10,642,222 B2
(45) Date of Patent: May 5, 2020

(54) DISPLAY APPARATUS AND DISPLAY METHOD

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN); Can Zhang, Beijing (CN); Wei Wang, Beijing (CN); Xianqin Meng, Beijing (CN); Can Wang, Beijing (CN); Pengcheng Lu, Beijing (CN); Qian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/758,981

(22) PCT Filed: Aug. 24, 2017

(86) PCT No.: PCT/CN2017/098835
§ 371 (c)(1),
(2) Date: Mar. 9, 2018

(87) PCT Pub. No.: WO2018/076914
PCT Pub. Date: May 3, 2018

(65) Prior Publication Data
US 2019/0339648 A1     Nov. 7, 2019

(30) Foreign Application Priority Data

Oct. 31, 2016    (CN) .......................... 2016 1 0928501

(51) Int. Cl.
*G09G 3/36*      (2006.01)
*G03H 1/22*      (2006.01)
*G02F 1/1343*    (2006.01)

(52) U.S. Cl.
CPC ............. *G03H 1/2294* (2013.01); *G09G 3/36* (2013.01); *G02F 1/1343* (2013.01); *G09G 2300/0478* (2013.01)

(58) Field of Classification Search
CPC . G09G 3/36; G09G 2300/0478; G02F 1/1343
See application file for complete search history.

(56) References Cited

U.S. PATENT DOCUMENTS

| | | |
|---|---|---|
| 8,854,596 B2 | 10/2014 | Kim et al. |
| 2005/0083559 A1 | 4/2005 | Horikoshi et al. |

(Continued)

FOREIGN PATENT DOCUMENTS

| | | |
|---|---|---|
| CN | 1591238 A | 3/2005 |
| CN | 101065713 A | 10/2007 |

(Continued)

OTHER PUBLICATIONS

First Office Action for Chinese Application No. 201610928501.5, dated May 2, 2017, 5 Pages.

(Continued)

*Primary Examiner* — Lixi C Simpson
(74) *Attorney, Agent, or Firm* — Brooks Kushman P.C.

(57) ABSTRACT

The present disclosure provides a display apparatus and a displaying method. The display apparatus includes an optical device, a laser source at a light incident side of the optical device, a driving circuit coupled to the optical device, and a holographic image data storing device coupled to the driving circuit. The optical device includes a plurality of mutually independent optical units, the optical units are capable of refracting incident linearly polarized laser light, refractive indexes of the optical units are adjustable, and the refractive indexes of adjacent optical units are changed according to a sinusoidal curve. The driving circuit is to obtain image data of the to-be-displayed holographic image from the holo- (Continued)

graphic image data storing device, and adjust the refractive index of each optical unit according to the image data. The laser source is to emit laser beams corresponding to a to-be-displayed holographic image.

2 Claims, 3 Drawing Sheets

(56) References Cited

U.S. PATENT DOCUMENTS

| | | | |
|---|---|---|---|
| 2008/0089073 A1 | 4/2008 | Hikmet | |
| 2008/0309999 A1 | 12/2008 | Yoshikawa et al. | |
| 2010/0194668 A1 | 8/2010 | Adzhalov | |
| 2012/0120059 A1* | 5/2012 | Bratkovski | G03H 1/02 345/419 |
| 2012/0154715 A1 | 6/2012 | Kim et al. | |
| 2013/0120817 A1* | 5/2013 | Yoon | G02F 1/1393 359/32 |
| 2014/0363162 A1 | 12/2014 | Chu et al. | |
| 2015/0331297 A1 | 11/2015 | Han et al. | |
| 2016/0187851 A1* | 6/2016 | Park | G03H 1/2294 359/9 |
| 2018/0173082 A1* | 6/2018 | Okumura | G03H 1/16 |

FOREIGN PATENT DOCUMENTS

| | | |
|---|---|---|
| CN | 100430841 C | 11/2008 |
| CN | 101390020 A | 3/2009 |
| CN | 101614836 A | 12/2009 |
| CN | 101939706 A | 1/2011 |
| CN | 103838125 A | 6/2014 |
| CN | 104204916 A | 12/2014 |
| CN | 106338905 A | 1/2017 |

OTHER PUBLICATIONS

International Search Report and Written Opinion for Application No. PCT/CN2017/098835, dated Nov. 15, 2017, 10 Pages.
Search Report for Chinese Application No. 201610928501.5, dated Feb. 16, 2017, 6 Pages.
Second Office Action for Chinese Application No. 201610928501.5, dated Aug. 10, 2017, 3 Pages.

* cited by examiner

--Prior Art--

DISPLAY APPARATUS AND DISPLAY METHOD

CROSS-REFERENCE TO RELATED APPLICATIONS

This application is the U.S. national phase of PCT Application No. PCT/CN2017/098835 filed on Aug. 24, 2017, which claims priority to Chinese Patent Application No. 201610928501.5 filed on Oct. 31, 2016, which are incorporated herein by reference in their entireties.

TECHNICAL FIELD

The present disclosure relates to the field of displaying technology, and in particular to a display apparatus and a displaying method.

BACKGROUND

A holographic plate records amplitude and phase information of object beams in form of contrast and brightness-and-darkness changes, thereby forming irregular interference fringes. A holographic image obtained by treating a photosensitive holographic plate through processes such as developing and photographic fixing, is equivalent to a diffraction grating with depths of grating grooves being related to morphology of a photographed object. When the holographic plate is irradiated by reference beams, the human eye can view the holographic plate in projected light, and then a reproductive image which is the same as the original object can be seen.

The disadvantage of the related art lies in that the holographic plate records a static image and cannot display dynamically displaying a holographic image.

SUMMARY

One technical problem to be solved by the resent disclosure is to provide a display apparatus and a displaying method, which can realize dynamically displaying a holographic image.

In order to solve the above technical problem, embodiments of the present disclosure provide the following technical solutions.

According to a first aspect, a display apparatus is provided and includes:

an optical device;

a laser source at a light incident side of the optical device and configured to emit laser beams corresponding to a to-be-displayed holographic image;

a driving circuit coupled to the optical device; and a holographic image data storing device coupled to the driving circuit;

wherein the optical device includes a plurality of mutually independent optical units, the optical units are capable of refracting incident linearly polarized laser light, refractive indexes of the optical units are adjustable, and the refractive indexes of adjacent optical units are changed according to a sinusoidal curve; and wherein the driving circuit is configured to obtain image data of the to-be-displayed holographic image from the holographic image data storing device, and adjust the refractive index of each optical unit according to the image data.

Optionally, the optical device includes: a first transparent substrate and a second transparent substrate opposite to the first transparent substrate; a liquid crystal cell between the first transparent substrate and the second transparent substrate, where the liquid crystal cell includes a plurality of mutually independent liquid crystal units; and a first electrode and a second electrode. The first electrode and the second electrode are on different ones of the transparent substrates or on an identical one of the transparent substrates, and the first electrode and the second electrode are capable of generating an electric field between the first electrode and the second electrode to drive liquid crystal molecules in the liquid crystal units to deflect. Each liquid crystal unit, the first electrode and the second electrode corresponding to the each liquid crystal unit define one of the optical units.

Optionally, the display apparatus further includes a polarizer attached to the light incident side of the optical device; wherein an initial alignment direction of the liquid crystal molecules in the liquid crystal units is parallel to a light transmission axis of the polarizer.

Optionally, the driving circuit is specifically configured to determine the refractive index of each optical unit according to the image data, and drive liquid crystal molecules in the liquid crystal units to deflect according to the determined refractive index.

Optionally, the driving circuit includes a calculation circuit configured to determine a holographic plate corresponding to the to-be-displayed holographic image according to the image date and calculate the refractive index of each optical unit according to the formula $(d_j-d_{j-1})*(n-1)=d*(n_j-n_{j-1})$; wherein the holographic plate corresponding to the to-be-displayed holographic image is divided into m portions in a width direction of the holographic plate; each portion includes (2N−1) grating grooves; in each portion, adjacent grating grooves have different depths; among the (2N−1) grating grooves in each portion, the depths of the grating grooves from a first grating groove to an N-th grating groove are gradually increased, and the depths of the grating grooves from the N-th grating groove to a (2N−1)-th grating groove are gradually reduced; in a width direction of the optical device, the optical device includes m optical units which are corresponding to the portions of the holographic plate, respectively; each optical unit is divided into (2N−1) regions, $d_j$ represents a depth of a j-th grating groove of each portion, d represents a cell thickness of the liquid crystal cell, $n_j$ represents a refractive index of a j-th region in each optical unit, m and N are integers which are greater than 1, and j is an integer which is greater than 0 and is less than or equal to (2N−1).

Optionally, the laser source is specifically configured to emit reference beams corresponding to the to-be-displayed holographic image; or emit conjugate beams of the reference beams corresponding to the to-be-displayed holographic image.

Optionally, the laser source is specifically configured to emit linearly polarized laser light, and polarization direction of light beams of the laser light is parallel to the initial alignment direction of the liquid crystal molecules in the liquid crystal units.

One embodiment of the present disclosure further provides a displaying method applied to the above display apparatus and including: obtaining image data of a to-be-displayed holographic image; and adjusting a refractive index of each optical unit according to the image data.

Optionally, when the display apparatus includes the optical device of claim 2, the adjusting a refractive index of each optical unit according to the image data includes: determining the refractive index of each optical unit according to the image data; and driving liquid crystal molecules in the liquid crystal units to deflect according to the determined refractive index.

Optionally, the determining the refractive index of each optical unit according to the image data includes: determining a holographic plate corresponding to the to-be-displayed holographic image according to the image date; and calculating the refractive index of each optical unit according to the formula $(d_j-d_{j-1})*(n-1)=d*(n_j-n_{j-1})$; wherein the holographic plate corresponding to the to-be-displayed holographic image is divided into m portions in a width direction of the holographic plate; each portion includes (2N−1) grating grooves; in each portion, adjacent grating grooves have different depths; among the (2N−1) grating grooves in each portion, the depths of the grating grooves from a first grating groove to an N-th grating groove are gradually increased, and the depths of the grating grooves from the N-th grating groove to a (2N−1)-th grating groove are gradually reduced; in a width direction of the optical device, the optical device includes m optical units which are corresponding to the portions of the holographic plate, respectively; each optical unit is divided into (2N−1) regions, $d_j$ represents a depth of a j-th grating groove of each portion, d represents a cell thickness of the liquid crystal cell, $n_j$ represents a refractive index of a j-th region in each optical unit, m and N are integers which are greater than 1, and j is an integer which is greater than 0 and is less than or equal to (2N−1).

DETAILED DESCRIPTION

In order to make the problems to be solved, the technical solutions and the advantages of embodiments of the present disclosure more apparent, the present disclosure will be described hereinafter in a clear and complete manner in conjunction with the drawings and embodiments.

Figure 1:
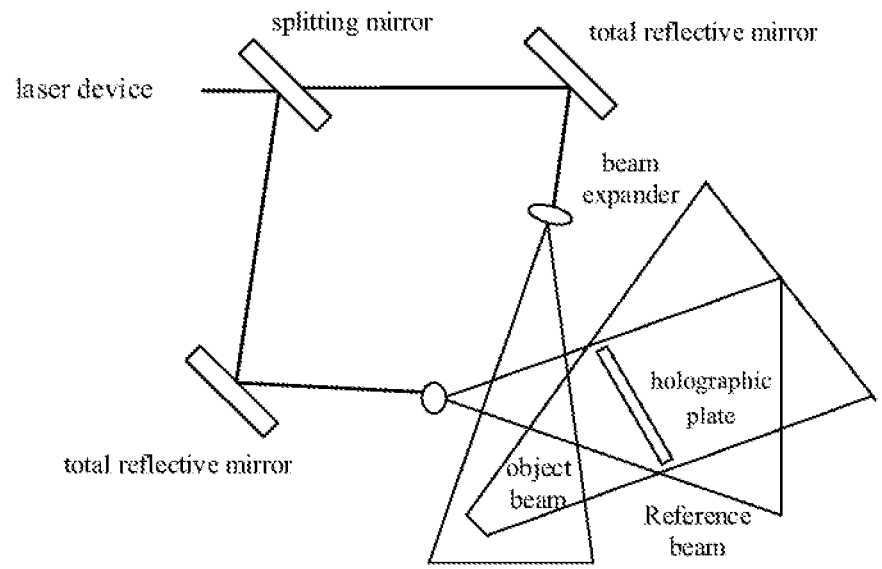
FIG. 1 is a schematic showing a holographic plate displaying an image in the related art.
Figure 2:
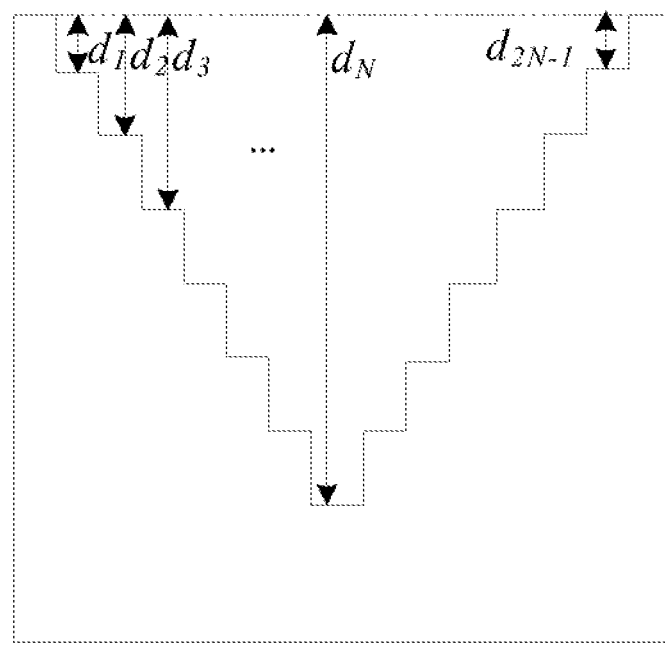
FIG. 2 is a schematic cross-sectional view of the holographic plate.

As shown in FIG. 1, a holographic plate in the related art records amplitude and phase information of object beams in form of contrast and brightness-and-darkness changes, thereby forming irregular interference fringes.

$$x = \frac{\lambda}{2\sin\frac{\theta}{2}}$$

Where θ represents an included angle between reference beams and object beams when they are irradiated on the holographic plate, and λ represents a beam wavelength. A holographic image obtained by treating a photosensitive holographic plate through processes such as developing and photographic fixing, is equivalent to an amplitude diffraction grating with transmittance coefficients changing in form of sine wave. The amplitude diffraction grating can be converted into a phase diffraction grating as shown in FIG. 2 through bleaching process, ion etching techniques or photolithography. Thicknesses $d_j$ (j is an integer which is greater than 1) of the grating grooves are related to morphology of a photographed object. As can be seen, thicknesses of the grating grooves are changed according to a sine curve. Then, when the holographic plate is irradiated by reference beams, the human eye can view the holographic plate in projected light, and then a reproductive image which is the same as the original object can be seen.

The disadvantage of the related art lies in that the holographic plate records a static image and cannot display dynamically displaying a holographic image.

In order to solve the above problems, one embodiment of the present disclosure provides a display apparatus and a displaying method, which can realize dynamically displaying a holographic image.

One embodiment of the present disclosure provides a display apparatus which includes an optical device, a laser source arranged at a light incident side of the optical device, a driving circuit coupled to the optical device, and a holographic image data storing device coupled to the driving circuit.

The optical device includes a plurality of mutually independent optical units. The optical units are capable of refracting incident linearly polarized laser light. Refractive indexes of the optical units are adjustable. The refractive indexes of adjacent optical units are changed according to a sinusoidal curve.

The laser source is configured to emit laser beams corresponding to a to-be-displayed holographic image.

The driving circuit is configured to obtain image data of the to-be-displayed holographic image from the holographic image data storing device, and adjust the refractive index of each optical unit according to the image data.

In this embodiment, when displaying a holographic image, the laser source emits laser beams corresponding to one to-be-displayed holographic image. The optical units are capable of refracting incident linearly polarized laser light and the refractive indexes of the optical units are adjustable. By controlling the refractive indexes of the optical units, optical path differences of the laser beams in the optical device is caused to be equivalent to optical path differences of the laser beams in a common holographic plate, thereby realizing displaying the holographic image. Meanwhile, since the refractive indexes of the optical units are dynamically adjustable, the holographic image may be dynamically displayed when the optical device is irradiated with reference beams.

In one specific embodiment, the optical device includes:

a first transparent substrate and a second transparent substrate opposite to the first transparent substrate;

a liquid crystal cell between the first transparent substrate and the second transparent substrate, where the liquid crystal cell is divided into a plurality of mutually independent liquid crystal units;

a first electrode and a second electrode, where the first electrode and the second electrode may be disposed on different transparent substrates or disposed on the same transparent substrate, and the first electrode and the second electrode can generate an electric field therebetween to drive liquid crystal molecules in the liquid crystal units to deflect.

Each liquid crystal unit, the corresponding first electrode and the corresponding second electrode define one optical unit.

Further, the optical device further includes a polarizer attached to the light incident side of the optical device. An initial alignment direction of the liquid crystal molecules in the liquid crystal units is parallel to a light transmission axis of the polarizer. Since the optical units can only refract linearly polarized laser light, the polarizer is attached to the light incident side of the optical device. The initial alignment direction of the liquid crystal molecules in the liquid crystal units is parallel to the light transmission axis of the polarizer. The polarizer can convert incident laser light into the linearly polarized laser light so that the optical units refract incident linearly polarized laser light.

Further, the driving circuit is specifically configured to determine the refractive index of each optical unit according to the image data, and drive liquid crystal molecules in the liquid crystal units to deflect according to the determined refractive index.

Further, the driving circuit includes a calculation circuit, which is configured to determine a holographic plate corresponding to the to-be-displayed holographic image according to the image date, and calculate the refractive index of each optical unit according to the formula $(d_j-d_{j-1})*(n-1) = d*(n_j-n_{j-1})$.

The holographic plate corresponding to the to-be-displayed holographic image is divided into m portions in a width direction of the holographic plate. Each portion includes (2N−1) grating grooves. In each portion, adjacent grating grooves have different depths. Among the (2N−1) grating grooves in each portion, the depths of the grating grooves from the first grating groove to the N-th grating groove are gradually increased, and the depths of the grating grooves from the N-th grating groove to the (2N−1)-th grating groove are gradually reduced. In a width direction of the optical device, the optical device includes m optical units which are corresponding to the portions of the holographic plate, respectively. Each optical unit is divided into (2N−1) regions, $d_j$ represents a depth of the j-th grating groove of each portion, d represents a cell thickness of the liquid crystal cell, $n_j$ represents a refractive index of the j-th region in each optical unit, m and N are integers which are greater than 1, j is an integer which is greater than 0 and is less than or equal to (2N−1).

Further, the laser source is specifically configured to emit reference beams corresponding to the to-be-displayed holographic image; or emit conjugate beams of the reference beams corresponding to the to-be-displayed holographic image. When the laser source emits the reference beams corresponding to the to-be-displayed holographic image, a virtual image of the holographic image can be seen by the human eye at the light incident side of the optical device. When the laser source emits the conjugate beams of the reference beams corresponding to the to-be-displayed holographic image, a real image of the holographic image can be seen on an observation screen at a light emitting side of the optical device.

Further, the laser source is specifically configured to emit linearly polarized laser light, and polarization direction of light beams of the laser light is parallel to the initial alignment direction of the liquid crystal molecules in the liquid crystal units. When the laser source emits the linearly polarized laser light, the polarizer attached to the optical device can be eliminated.

One embodiment of the present disclosure further provides a displaying method applied to the above display apparatus. The displaying method includes: obtaining image data of a to-be-displayed holographic image, and adjusting a refractive index of each optical unit according to the image data.

In this embodiment, when displaying a holographic image, the laser source emits laser beams corresponding to one to-be-displayed holographic image. The optical units are capable of refracting incident linearly polarized laser light and the refractive indexes of the optical units are adjustable. By controlling the refractive indexes of the optical units, optical path differences of the laser beams in the optical device are caused to be equivalent to optical path differences of the laser beams in a common holographic plate, thereby realizing displaying the holographic image. Meanwhile, since the refractive indexes of the optical units are dynamically adjustable, the holographic image may be dynamically displayed when the optical device is irradiated with reference beams.

Further, the adjusting a refractive index of each optical unit according to the image data includes: determining the refractive index of each optical unit according to the image data, and driving liquid crystal molecules in the liquid crystal units to deflect according to the determined refractive index.

Further, the determining the refractive index of each optical unit according to the image data includes:

determining a holographic plate corresponding to the to-be-displayed holographic image according to the image date, and calculating the refractive index of each optical unit according to the formula $(d_j-d_{j-1})*(n-1)=d*(n_j-n_{j-1})$, where the holographic plate corresponding to the to-be-displayed holographic image is divided into m portions in a width direction of the holographic plate, each portion includes (2N−1) grating grooves; in each portion, adjacent grating grooves have different depths; among the (2N−1) grating grooves in each portion, the depths of the grating grooves from the first grating groove to the N-th grating groove are gradually increased, and the depths of the grating grooves from the N-th grating groove to the (2N−1)-th grating groove are gradually reduced; in a width direction of the optical device, the optical device includes m optical units which are corresponding to the portions of the holographic plate, respectively; each optical unit is divided into (2N−1) regions, $d_j$ represents a depth of the j-th grating groove of each portion, d represents a cell thickness of the liquid crystal cell, $n_j$ represents a refractive index of the j-th region in each optical unit, m and N are integers which are greater than 1, j is an integer which is greater than 0 and is less than or equal to (2N−1).

The display apparatus of the present disclosure will be further described hereinafter in conjunction with the drawings.

Figure 3:
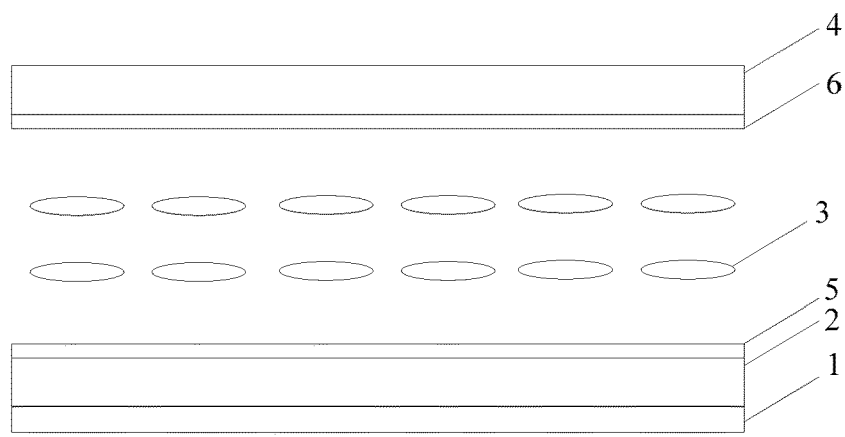
FIG. 3 and FIG. 4 are schematic cross-sectional views of an optical device according to an embodiment of the present disclosure.

FIG. 3 is a schematic view of an optical device according to an embodiment of the present disclosure. The optical device is composed of mutually independent optical units. The optical units are capable of refracting incident linearly polarized laser light. Refractive indexes of the optical units are adjustable. The refractive indexes of adjacent optical units are changed according to a sinusoidal curve. As shown in FIG. 3, the optical device includes a polarizer 1, a base substrate 2, a first electrode 5, a liquid crystal cell 3, a second electrode 6 and a base substrate 4 which are arranged sequentially.

The first electrode 5 is on a top surface of the base substrate 2. The second electrode 6 is on a bottom surface of the base substrate 4. The first electrode 5 and the second electrode 6 are transparent electrodes. The first electrode 5 may be a strip-shaped electrode, and the second electrode 6 may be a planar electrode; or, first electrode 5 may be a planar electrode, and the second electrode 6 may be a strip-shaped electrode, as long as the first electrode 5 and the second electrode 6 can generate an electric field therebetween to drive liquid crystal molecules in the liquid crystal units to deflect.

In this embodiment, the initial alignment direction of the liquid crystal molecules in the liquid crystal cell 3 is parallel to the light transmission axis of the polarizer 1.

When the linearly polarized laser light passes through the liquid crystal cell, different liquid crystal deflection states correspond to different refractive indexes. When long axis directions of liquid crystal molecules are parallel to the polarization direction of light beams of the laser light, then a refractive index of the light beams in the liquid crystal cell is ne; and when the long axis directions of liquid crystal molecules are perpendicular to the polarization direction of light beams of the laser light, then a refractive index of the light beams in the liquid crystal cell is no, where ne>no. When the light beams propagate in the liquid crystal cell, refractive indexes of the light beams vary between ne and no. By using this feature, when the light beams propagate in the liquid crystal cell, an optical path difference of adjacent laser beams is caused to be equal to an optical path difference of the adjacent laser beams in one holographic plate, thereby enabling a modulation function of the liquid crystal cell to geometry directions of the light beams to be equivalent to a modulation function of the holographic plate to geometry directions of the light beams. Thus, by using this feature, the liquid crystal cell is equivalent to the holographic plate in nature.

Figure 4:
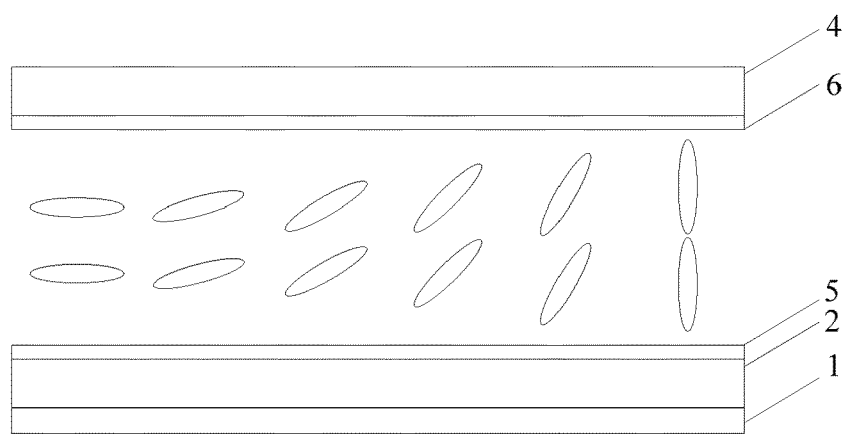

Applying voltages to the first electrode 5 and the second electrode 6 to drive the liquid crystal molecules can enable the liquid crystal cell to be equivalent to the holographic plate, and deflection states of liquid crystal molecules are similar to what is shown in FIG. 4.

The equivalent principle according to which the liquid crystal cell is equivalent to the holographic plate is to enable optical path differences of the light beams in the liquid crystal cell to be equivalent to optical path differences of the light beams in a common holographic plate.

Figure 5:
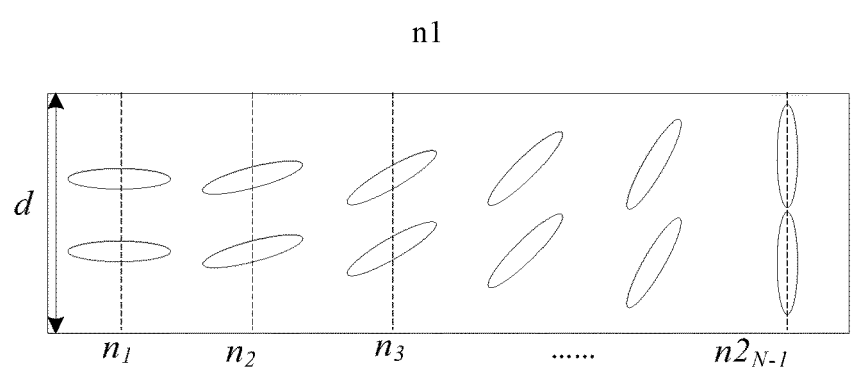
FIG. 5 is a schematic diagram showing that different optical units have different refractive indexes.

The holographic plate corresponding to the to-be-displayed holographic image is divided into m portions in a width direction of the holographic plate. As shown in FIG. 2, each portion includes (2N−1) grating grooves. In each portion, adjacent grating grooves have different depths. Among the (2N−1) grating grooves in each portion, the depths of the grating grooves from the first grating groove to the N-th grating groove are gradually increased, and the depths of the grating grooves from the N-th grating groove to the (2N−1)-th grating groove are gradually reduced. In a width direction of the optical device, the optical device includes m optical units which are corresponding to the portions of the holographic plate, respectively. As shown in FIG. 5, each optical unit is divided into (2N−1) regions, $d_j$ represents a depth of the j-th grating groove of each portion, d represents a cell thickness of the liquid crystal cell, $n_j$ represents a refractive index of the j-th region in each optical unit, m and N are integers which are greater than 1, j is an integer which is greater than 0 and is less than or equal to (2N−1). When the liquid crystal cell is equivalent to the holographic plate, the refractive index of each optical unit can be calculated according to the formula $(d_j-d_{j-1})*(n-1)=d*(n_j-n_{j-1})$.

When the display apparatus dynamically displays a holographic image, the display apparatus first obtains image data of a to-be-displayed holographic image, then determines a holographic plate corresponding to the to-be-displayed holographic image according to the image date, calculates the refractive index of each optical unit according to the above formula, and then drives liquid crystal molecules in the liquid crystal units to deflect according to the determined refractive index, thereby enabling the optical device to be equivalent to the holographic plate.

Figure 6:
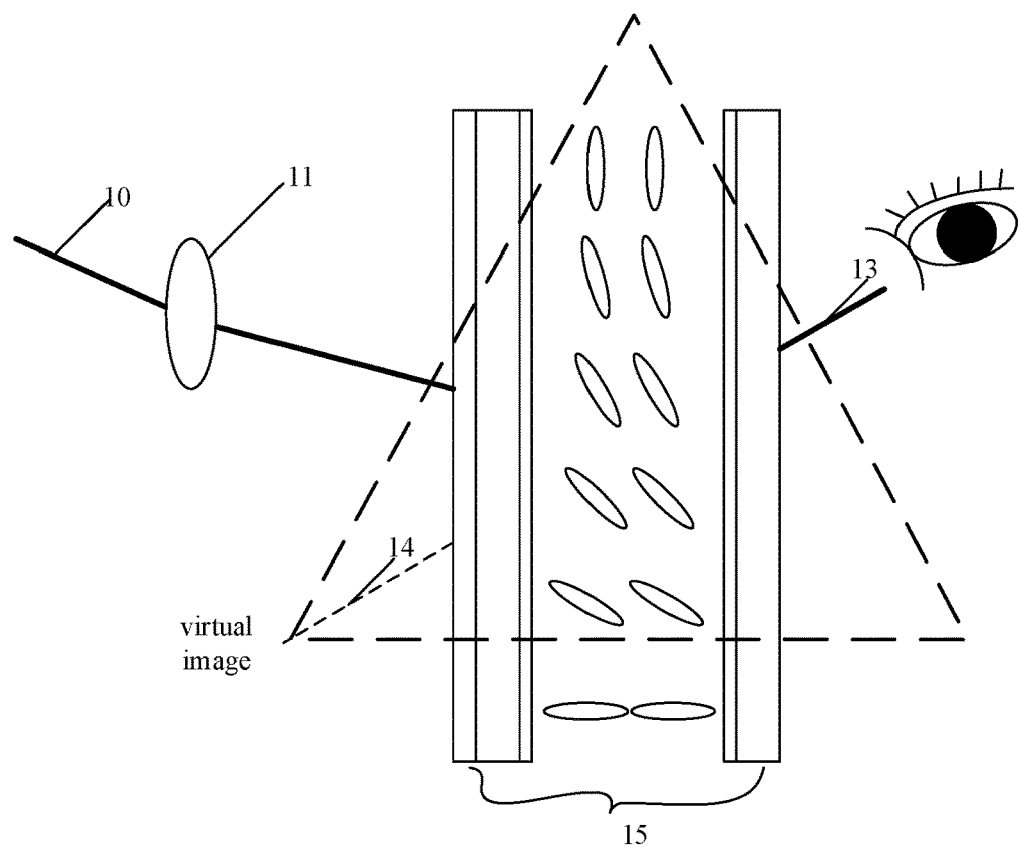
FIG. 6 is a schematic diagram of displaying a virtual image according to an embodiment of the present disclosure.

As shown in FIG. 6, when the optical device 15 which is equivalent to the holographic plate is irradiated by light beams 10 which are the same as the reference beams, the light beams 10 enter into the optical device 15 through a beam expander 11, and then light beams 13 leave from the optical device and then enter the human eye. Thus, the human eye sees the optical device 15 which is equivalent to the holographic plate in transmitted light, and then a reproductive image which is the same as an original object of the equivalent holographic plate can be seen at back of the optical device 15. At this time, the reproductive image is a virtual image. The number 14 represents a reverse extension line of the reference beam that passes through the optical device.

Figure 7:
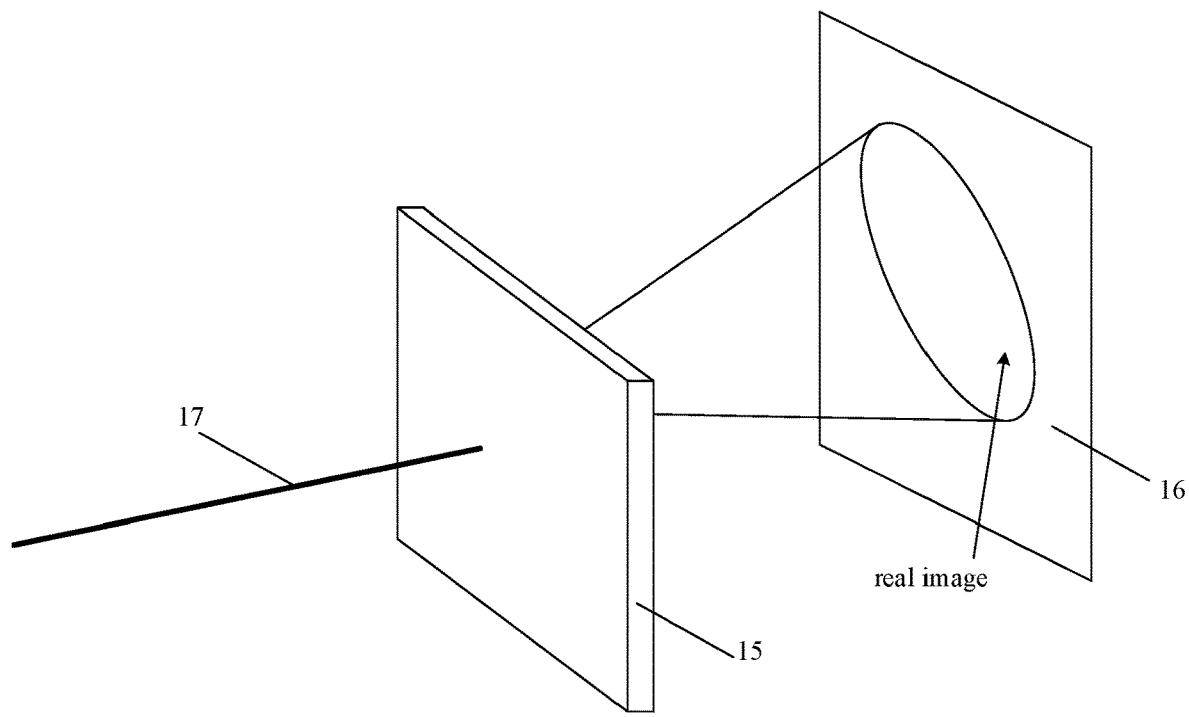
FIG 7 is a schematic diagram of displaying a real image according to an embodiment of the present disclosure.

As shown in FIG. 7, when the optical device 15 which is equivalent to the holographic plate is irradiated by light beams 17 which are the same as the conjugate beams of the reference beams, spherical light beams emit from the light emitting side of the optical device 15 which is equivalent to the holographic plate and converge at one convergence point. An observation screen 16 may be placed at the convergence point, and then a reproductive image which is the same as an original object of the equivalent holographic plate can be shown on the observation screen 16. At this time, the reproductive image is a real image.

In this embodiment, the refractive indexes of the optical units can be adjusted by adjusting the voltages applied to the first electrode and the second electrode. Thus, by controlling the refractive indexes of the optical units, optical path differences of the reference beams in the optical device is caused to be equivalent to optical path differences of the reference beams in a common holographic plate, thereby realizing displaying the holographic image. Meanwhile, since the refractive indexes of the optical units are dynamically adjustable, the holographic image may be dynamically displayed when the optical device is irradiated with reference beams or conjugate beams of the reference beams.

Further, when light beams irradiated on the optical device which is equivalent to the holographic plate, are linearly polarized laser beams, and when the polarization direction of the light beams is parallel to the initial alignment direction of the liquid crystal molecules in the optical device, the polarizer attached to the optical device can be eliminated.

It may be appreciated that, the above embodiments are optional embodiments of the present disclosure. A person skilled in the art may make further modifications and improvements without departing from the principle of the present disclosure, and these modifications and improvements shall also fall within the scope of the present disclosure.

What is claimed is:

1. A displaying method applied to a display apparatus which comprises:
   an optical device;
   a laser source at a light incident side of the optical device and configured to emit laser beams corresponding to a to-be-displayed holographic image;

a driving circuit coupled to the optical device; and
a holographic image data storing device coupled to the driving circuit;
wherein the optical device includes a plurality of mutually independent optical units, the optical units are capable of refracting incident linearly polarized laser light, refractive indexes of the optical units are adjustable, and the refractive indexes of adjacent optical units are changed according to a sinusoidal curve; and
wherein the driving circuit is configured to obtain image data of the to-be-displayed holographic image from the holographic image data storing device, and adjust the refractive index of each optical unit according to the image data;
wherein the method comprises:
obtaining image data of a to-be-displayed holographic image; and
adjusting a refractive index of each optical unit according to the image data;
wherein the optical device includes:
a first transparent substrate and a second transparent substrate opposite to the first transparent substrate;
a liquid crystal cell between the first transparent substrate and the second transparent substrate, where the liquid crystal cell includes a plurality of mutually independent liquid crystal units; and
a first electrode and a second electrode, where the first electrode and the second electrode are on different ones of the transparent substrates or on an identical one of the transparent substrates, and the first electrode and the second electrode are capable of generating an electric field between the first electrode and the second electrode to drive liquid crystal molecules in the liquid crystal units to deflect;
wherein each liquid crystal unit, the first electrode and the second electrode corresponding to the each liquid crystal unit define one of the optical units; the adjusting a refractive index of each optical unit according to the image data includes:
determining the refractive index of each optical unit according to the image data; and
driving liquid crystal molecules in the liquid crystal units to deflect according to the determined refractive index;
wherein the determining the refractive index of each optical unit according to the image data includes:
determining a holographic plate corresponding to the to-be-displayed holographic image according to the image date; and
calculating the refractive index of each optical unit according to a formula $(d_j-d_{j-1})*(n-1)=d*(n_j-n_{j-1})$;
wherein the holographic plate corresponding to the to-be-displayed holographic image is divided into m portions in a width direction of the holographic plate; each portion includes (2N−1) grating grooves; in each portion, adjacent grating grooves have different depths; among the (2N−1) grating grooves in each portion, depths of the grating grooves from a first grating groove to an N-th grating groove are gradually increased, and depths of the grating grooves from the N-th grating groove to a (2N−1)-th grating groove are gradually reduced; in a width direction of the optical device, the optical device includes m optical units which are corresponding to the portions of the holographic plate, respectively; each optical unit is divided into (2N−1) regions, $d_j$ represents a depth of a j-th grating groove of each portion, d represents a cell thickness of the liquid crystal cell, $n_j$ represents a refractive index of a j-th region in each optical unit, m and N are integers which are greater than 1, and j is an integer which is greater than 0 and is less than or equal to (2N−1).

2. A display apparatus comprising:
an optical device;
a laser source at a light incident side of the optical device and configured to emit laser beams corresponding to a to-be-displayed holographic image;
a driving circuit coupled to the optical device; and
a holographic image data storing device coupled to the driving circuit;
wherein the optical device includes a plurality of mutually independent optical units, the optical units are capable of refracting incident linearly polarized laser light, refractive indexes of the optical units are adjustable, and the refractive indexes of adjacent optical units are changed according to a sinusoidal curve; and
wherein the driving circuit is configured to obtain image data of the to-be-displayed holographic image from the holographic image data storing device, and adjust the refractive index of each optical unit according to the image data;
wherein the optical device includes:
a first transparent substrate and a second transparent substrate opposite to the first transparent substrate;
a liquid crystal cell between the first transparent substrate and the second transparent substrate, where the liquid crystal cell includes a plurality of mutually independent liquid crystal units; and
a first electrode and a second electrode, where the first electrode and the second electrode are on different ones of the transparent substrates or on an identical one of the transparent substrates, and the first electrode and the second electrode are capable of generating an electric field between the first electrode and the second electrode to drive liquid crystal molecules in the liquid crystal units to deflect;
wherein each liquid crystal unit, the first electrode and the second electrode corresponding to the each liquid crystal unit define one of the optical units;
wherein the driving circuit is specifically configured to determine the refractive index of each optical unit according to the image data, and drive liquid crystal molecules in the liquid crystal units to deflect according to the determined refractive index;
wherein the driving circuit includes a calculation circuit configured to determine a holographic plate corresponding to the to-be-displayed holographic image according to the image date and calculate the refractive index of each optical unit according to a formula $(d_j-d_{j-1})*(n-1)=d*(n_j-n_{j-1})$;
wherein the holographic plate corresponding to the to-be-displayed holographic image is divided into m portions in a width direction of the holographic plate; each portion includes (2N−1) grating grooves; in each portion, adjacent grating grooves have different depths; among the (2N−1) grating grooves in each portion, depths of the grating grooves from a first grating groove to an N-th grating groove are gradually increased, and depths of the grating grooves from the N-th grating groove to a (2N−1)-th grating groove are gradually reduced; in a width direction of the optical device, the optical device includes m optical units which are corresponding to the portions of the holographic plate, respectively; each optical unit is divided into (2N−1) regions, $d_j$ represents a depth of a j-th grating groove of each portion, d represents a cell thickness of the liquid crystal cell, $n_j$ represents a refractive index of a j-th region in each optical unit, m and N are integers which are greater than 1, and j is an integer which is greater than 0 and is less than or equal to (2N−1).

* * * * *